United States Patent
Enderle et al.

(10) Patent No.: US 11,063,493 B1
(45) Date of Patent: Jul. 13, 2021

(54) SYSTEM AND INSTALLATION WITH A RAIL VEHICLE MOVABLY ARRANGED ON A RAIL PART

(71) Applicant: SEW-EURODRIVE GMBH & CO. KG, Bruchsal (DE)

(72) Inventors: Christian Enderle, Weingarten (DE); Olaf Simon, Untergrombach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/059,663

(22) PCT Filed: May 16, 2019

(86) PCT No.: PCT/EP2019/025151
§ 371 (c)(1),
(2) Date: Nov. 30, 2020

(87) PCT Pub. No.: WO2019/228666
PCT Pub. Date: Dec. 5, 2019

(30) Foreign Application Priority Data

May 29, 2018 (DE) .......................... 102018004276.7

(51) Int. Cl.
*H02K 7/18* (2006.01)
*H02K 35/02* (2006.01)

(52) U.S. Cl.
CPC ........... *H02K 7/1876* (2013.01); *H02K 35/02* (2013.01)

(58) Field of Classification Search
CPC .............................. H02K 7/1876; H02K 35/02
See application file for complete search history.

(56) References Cited

U.S. PATENT DOCUMENTS

| 9,484,786 | B2 | 11/2016 | Ruff |
| 9,509,304 | B2 | 11/2016 | Zahnradfabrik |
| 2016/0204686 | A1 | 7/2016 | Liu |
| 2018/0131371 | A1* | 5/2018 | Liu ........................ H02K 35/02 |

FOREIGN PATENT DOCUMENTS

| DE | 10147720 A1 | 4/2003 |
| DE | 102011078932 A1 | 1/2013 |
| DE | 102012203862 A1 | 9/2013 |
| WO | 2011117031 A1 | 9/2011 |

OTHER PUBLICATIONS

International Search Report issued in International Application No. PCT/EP2019/025151, dated Jul. 31, 2019, pp. 1-3, English Translation.

\* cited by examiner

*Primary Examiner* — Viet P Nguyen
(74) *Attorney, Agent, or Firm* — Carter DeLuca & Farrell LLP

(57) ABSTRACT

A system and installation with a rail vehicle movably arranged on a rail part, includes a first part and a second part. The first part and the second part are movable in parallel relative to each other in a movement direction. The first part has a winding around a leg of a coil core, e.g., a center leg, and the first part has a guide, e.g., a linear guide, and a permanent magnet situated so as to be movable in parallel with the movement direction, e.g., in a linear fashion. The permanent magnet is guided by the guide, e.g., in the movement direction, and, for example, is limited in the front and back in the movement direction.

22 Claims, 13 Drawing Sheets

SYSTEM AND INSTALLATION WITH A RAIL VEHICLE MOVABLY ARRANGED ON A RAIL PART

FIELD OF THE INVENTION

The present invention relates to a system and an installation with a rail vehicle movably arranged on a rail part.

BACKGROUND INFORMATION

It is generally conventional that a rail vehicle is movable on a rail part.

German Patent Document No. 10 2012 203 862 describes an actuating device for an induction generator.

German Patent Document No. 101 47 720 describes an autonomous energy generation system.

SUMMARY

Example embodiments of the present invention provide for maintaining safety-relevant functions of a rail system even during a malfunction of the electrical supply.

According to an example embodiment of the present invention, a system includes a first part and a second part. The first part and the second part are arranged in parallel with each other and are movable relative to each other in a movement direction. The first part has a winding around a leg of a coil core, e.g., a center leg, and the first part has a guide, e.g., a linear guide, and a permanent magnet, which is arranged so as to be movable in parallel with the movement direction. The permanent magnet is guided by the guide, e.g., in the movement direction, and is limited, especially in the front and back in the movement direction.

This has the advantage that the electrical energy is independent of the magnitude of the speed of the two parts relative to each other. In other words, the biasing is able to be obtained in a slow or rapid manner. However, regardless of the time used for the biasing, the generated energy pulse is substantially the same. Also, the energy of the respective pulse is independent of the relative movement direction with respect to each other. In addition, the same energy pulse is available even when travel in the same direction takes place multiple times. The system described herein works without wear and in a contactless manner. The energy coil is generated on both sides in a synchronous manner.

According to example embodiments, the magnetization direction of the permanent magnet is aligned in parallel with its movement direction inside the guide. This offers the advantage that the permanent magnet of the first part is repelled at a magnetic field generated by the second part, e.g., by a permanent magnet of the second part. The permanent magnet of the first part thus moves within the movement clearance provided by the guide up to the limits such that a magnetic bias voltage is initially generated, which instantaneously decays after an unstable position has been crossed, the greatest possible change in the magnetic flux flowing through the winding of the first part being induced during the decaying process. This is achieved in that the movement clearance of the permanent magnet is such that in one position the north pole is situated closer to the leg than the south pole, and in another position the south pole is situated closer to the leg than the north pole.

According to example embodiments, the movement clearance of the permanent magnet in the guide is such that in a first position the north pole of the permanent magnet is situated closer to the leg than the south pole of the permanent magnet, and that in a second position the south pole of the permanent magnet is situated closer to the leg than the north pole of the permanent magnet. This offers the advantage that the movement clearance allows for a reversal of the magnetic flux.

According to example embodiments, the freedom of movement of the permanent magnet in the guide is smaller than the length of the permanent magnet in the movement direction. This offers the advantage that a bias voltage is generated in the magnetic field when the permanent magnet strikes the respective limit stop. The mechanically performed work thus is stored in the magnetic flux density and converted into electric energy only during the relaxing.

According to example embodiments, a magnetic flux generated by the permanent magnet is conducted through the leg of the coil core, and the direction of the magnetic flux in the leg is a function of the position, e.g., the linear position, of the permanent magnet in the guide. For example, the direction of the magnetic flux arising in the leg in a first position, especially a linear position, of the permanent magnet is directed counter to the direction of the magnetic flux in the leg arising in a second position, especially a linear position, of the permanent magnet. This has the advantage that the change in position triggers the change in the magnetic flux and a high voltage is triggered as a result.

According to example embodiments, the permanent magnet strikes a first limit stop of the guide at the first position, and at the second position the permanent magnet strikes the other limit stop of the guide. This offers the advantage that a bias voltage is able to be built up further when the contact is made with a limit stop.

According to example embodiments, the second part has a second permanent magnet, e.g., one situated in a stationary manner, or the second part is provided in mirror symmetry with the first part, and the magnetization direction of the permanent magnet of the second part is aligned in parallel, e.g., rectified in parallel, with respect to the magnetization direction of the permanent magnet of the first part. This offers the advantage that if a stationary permanent magnet is provided, that is to say, e.g., a permanent magnet fixedly disposed on a rail part, the second part is readily configured.

According to example embodiments, the first part is set apart from the second part. This is considered advantageous insofar as an air gap exists between the two permanent magnets so that the biasing is able to be performed in a contactless manner.

According to example embodiments, the second part has a second winding around a second leg of a second coil core, e.g., the center leg, the second part has a second guide, especially a linear guide, and the second permanent magnet is movably situated in parallel with the movement direction, e.g., in particular movable in a linear fashion, the second permanent magnet being guided by the second guide, e.g., in the movement direction, and limited, e.g., in the front and back in the movement direction. This offers the advantage that a synchronous pulse triggering is able to take place on both sides, which means that a respective electronic circuit is able to be supplied on both sides.

According to example embodiments, the magnetization direction of the second permanent magnet is aligned in parallel with its movement direction inside the second guide. This has the advantage that the permanent magnet of the second part is repelled at a magnetic field generated by the first part, e.g., by a permanent magnet of the first part. The permanent magnet of the second part thus moves within the movement clearance provided by the guide up to the limit stops such that a magnetic bias is first built up which instantly decays once an unstable position has been crossed, the greatest possible change in the magnetic flux that flows through the winding of the second part being induced during the decay process. This is achieved in that the freedom of movement of the second permanent magnet has a magnitude such that in one position the north pole is situated closer to the leg of the coil core of the second part than the south pole, and that in another position the south pole is situated closer to the leg than the north pole.

According to example embodiments, a magnetic flux generated by the second permanent magnet is conducted through the leg of the second coil core, the direction of the magnetic flux generated by the second permanent magnet in the second leg is a function of the position, e.g., the linear position, of the second permanent magnet in the second guide, and e.g., the direction of the magnetic flux arising in the second leg in a first position, e.g., a linear position, of the second permanent magnet is directed counter to the direction of the magnetic flux in the second leg arising in a second position, e.g., a linear position, of the second permanent magnet. This has the advantage that the freedom of movement of the second permanent magnet allows for a reversal of the magnetic flux in the leg of the coil core of the second part.

According to example embodiments, the second permanent magnet has a freedom of movement in the second guide such that in a first position, the north pole of the second permanent magnet is situated closer to the leg than the south pole of the second permanent magnet, and in a second position, the south pole the second permanent magnet is situated closer to the leg than the north pole of the second permanent magnet. This has the advantage that the freedom of movement allows for a reversal of the magnetic flux.

According to example embodiments, the freedom of movement of the second permanent magnet in the guide is smaller than the length of the second permanent magnet in the movement direction. This offers the advantage that a magnetic bias is built up in the magnetic field when the second permanent magnet strikes the respective limit stop. The mechanically performed work thus is stored in the magnetic flux density and converted into electrical energy only during the relaxing.

According to example embodiments, in the first position, the second permanent magnet strikes a first limit stop of the second guide, and in the second position, the second permanent magnet strikes the other limit stop of the second guide. This has the advantage that the magnetic bias is able to be increased after the contact has occurred.

According to an example embodiment of the present invention, in an installation having a rail vehicle movably arranged on a rail part, the first part is arranged on the rail vehicle and the second part is arranged on the rail part.

This offers the advantage that safety functions are able to be provided even during a malfunction of the electrical energy supply.

According to example embodiments, the winding of the first part feeds an electronic circuit, which, e.g., has a sensor and transmits signals from the sensor in a contactless manner, e.g., to an electronic circuit of the second part. This offers the advantage that safety functions are able to be maintained even if the electrical power supply should fail.

According to example embodiments, the winding of the second part feeds a second electronic circuit, which, e.g., has a second sensor and transmits signals from the second sensor in a contactless manner, e.g., to the first electronic circuit of the first part. This offers the advantage that safety functions are able to be maintained even if the electrical power supply should fail.

According to example embodiments, the rail part is encompassed by a track switch of the installation. This is considered advantageous insofar as the safety or switching function of the track switch is able to be maintained.

Further features and aspects of example embodiments of the present invention are described in greater detail below with reference to the appended Figures.

DETAILED DESCRIPTION

As illustrated in the Figures, the system, e.g., a generator, has two parts which are linearly movable relative to each other.

Energy is therefore able to be generated by both parts when they are moving in parallel with each other in a linear fashion in each case. When these parts move past each other, permanent magnets are biased, and voltages are induced in respective windings 6 during the sudden relaxation by which an electronic circuit and/or a sensor is/are able to be supplied and evaluated.

For example, a rail vehicle, e.g., a suspended monorail, is equipped with the generator described herein. The first part of the generator is situated on the rail vehicle, and the second part is situated on a rail part of the rail train, especially directly or indirectly. In other words, the second part is stationary and the first part is able to move along with the rail vehicle.

The first part and the second part have the same configuration. In the event of a malfunction of the electrical supply of the rail train, an electrical supply is therefore available on the rail vehicle and also in a stationary scenario when the rail vehicle is manually moved or moved using some other energy source.

This is because the movement generates a magnetic bias of the permanent magnets of the two parts relative to each other, which suddenly relaxes during the further shifting movement.

As a result, a data transmission between the rail vehicle and a stationary electronic circuit is possible even in a failure of the energy supply. This is considered particularly advantageous when crossing a track switch so that it is able to be operated even in a currentless state.

Each one of the parts has a permanent magnet 1, which is linearly guided in a guide 2 in parallel, especially relative to the rail direction of the rail part. Guide 2 is also arranged as a limit stop in both directions, i.e., in the movement direction, especially in the rail direction, and counter to the movement direction, especially the rail direction.

Figure 1:
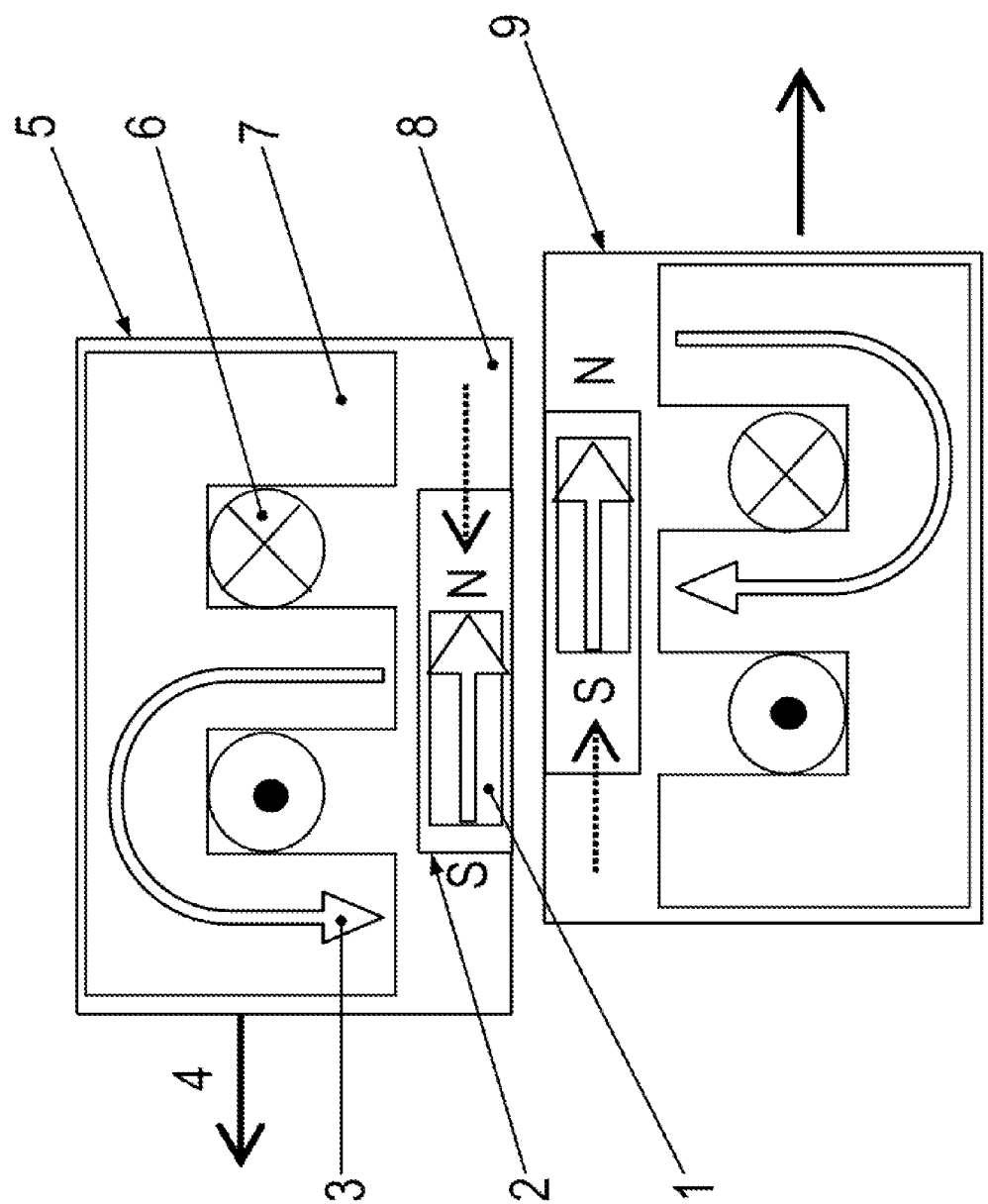
FIG. 1 is a schematic longitudinal cross-sectional view through a system according to an example embodiment of the present invention for the generation of electrical energy, e.g., a generator.
Figure 2:
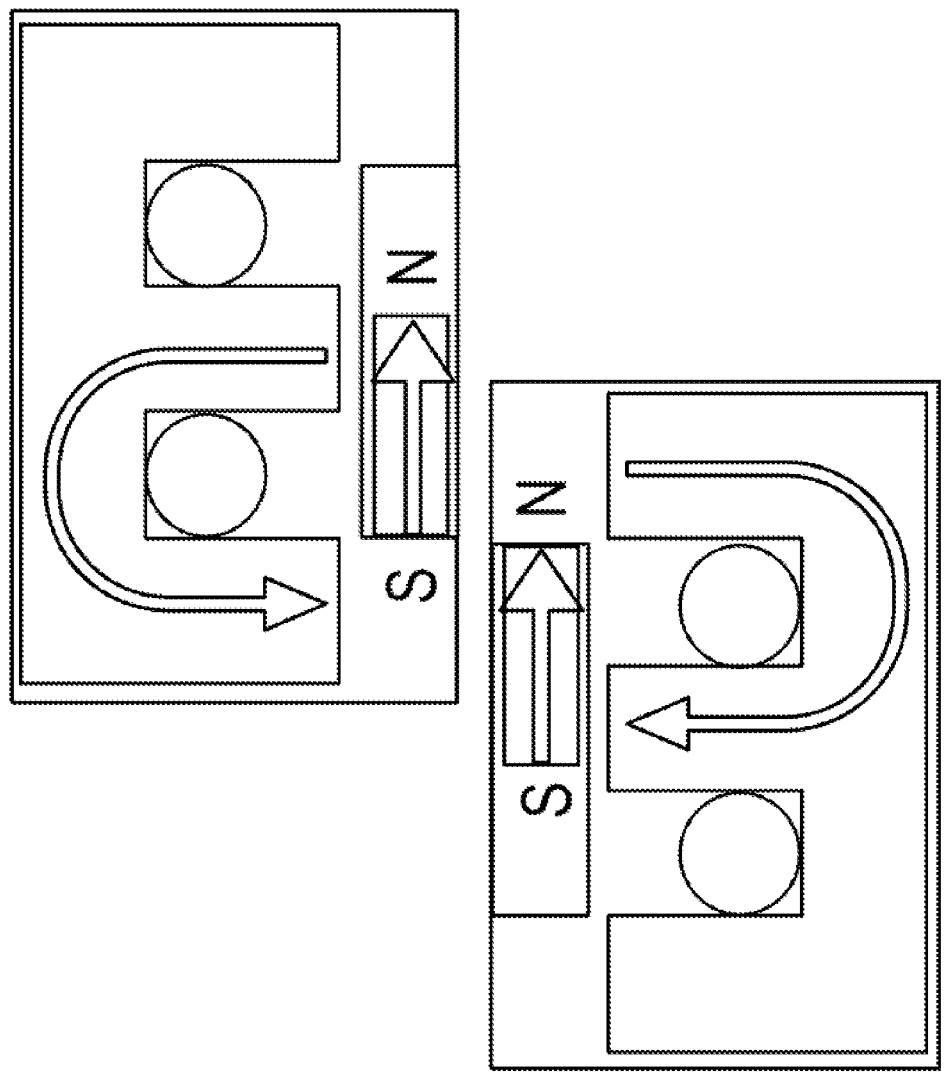
FIGS. 2 through 5 schematically illustrate the sequence of a pulse triggering during a movement of the two parts of the system relative to each other in a first direction.

As illustrated in FIG. 1, the magnetization direction of permanent magnet 1 of the first part is aligned counter to relative movement direction 4.

A coil core 7 arranged as an E-core carries a winding 6 around its center leg.

As illustrated in FIG. 1, the magnetic flux generated by the north pole of permanent magnet 1 flows into the center leg of coil core 7, via the yoke of the E-core to the outer leg of the E-core situated in front in the movement direction, and from there back to the south pole of permanent magnet 1.

The mirror-symmetrically configured second part is moved to the right in relation to the first part. As a result, both south poles repel each other and the permanent magnet of the second part travels all the way to the right inside the guide of the second part up to the limit stop on its guide so that the south pole of the permanent magnet of the second part is as far away as possible from the south pole of permanent magnet 1 of the first part and as close as possible to the north pole of permanent magnet 1 of the first part.

Permanent magnet 1 of the first part is correspondingly pushed to the left limit stop of guide 2, i.e., in the front in movement direction 4.

FIGS. 2 through 5 illustrate the biasing and subsequent relaxating of the permanent magnets of the two parts as a sequence of consecutive states. As illustrated, the magnetic flux in the center leg is reversed during the passing movement of FIG. 2 to FIG. 3. In the same manner, the magnetic flux is reversed during the passing movement from FIG. 4 to FIG. 5.

When the magnetic flux is reversed, a sudden pronounced change in the magnetic flux thus occurs, thereby inducing a voltage in winding 6 that supplies a respective electronic circuit.

The reversal takes place simultaneously in both parts.

Figure 3:
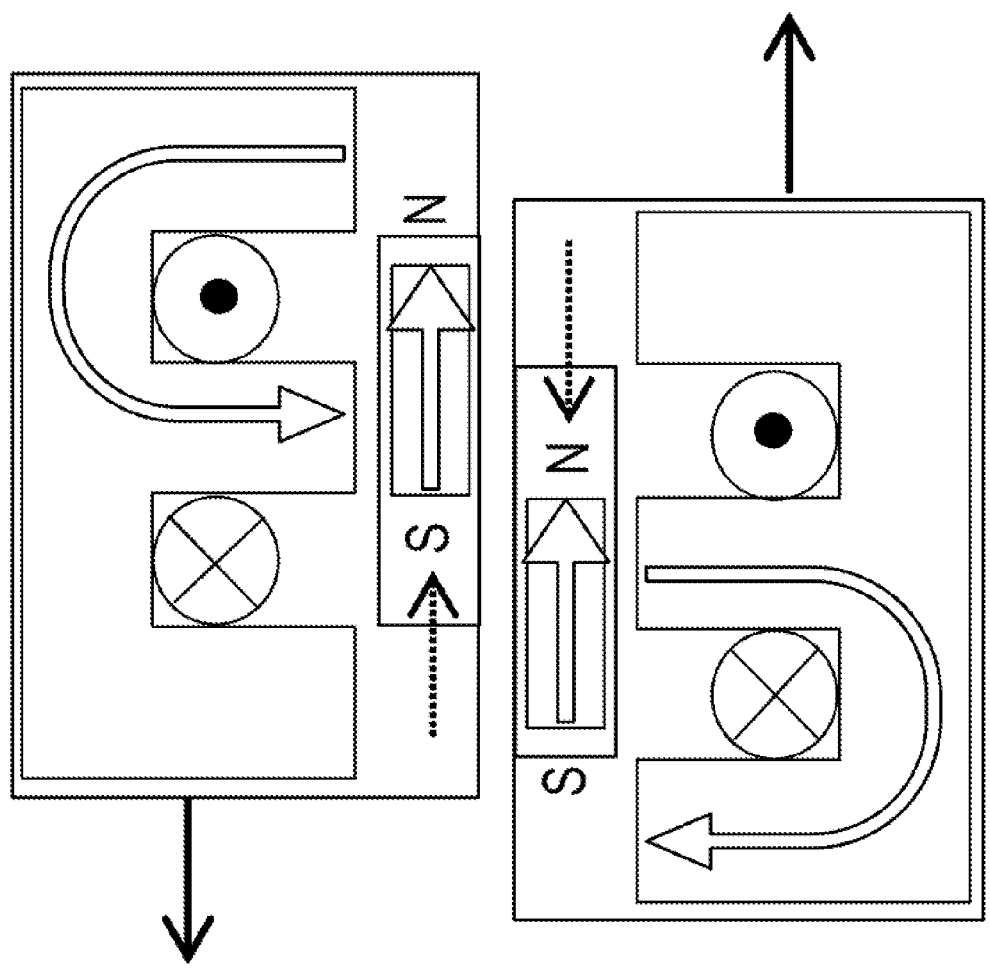

As illustrated in FIG. 3, the two parts are moved past each other along a common linear axis. The permanent magnets align within their respective degrees of freedom. Permanent magnet 1 of the first part is consequently pushed to the right against the limit stop and the permanent magnet of the second part is pushed to the left against its limit stop. The permanent magnets are then resting against their respective stops. Depending on the speed of the movement from the state illustrated in FIG. 2 to the state illustrated in FIG. 3, a voltage is induced in winding 6.

Figure 4:
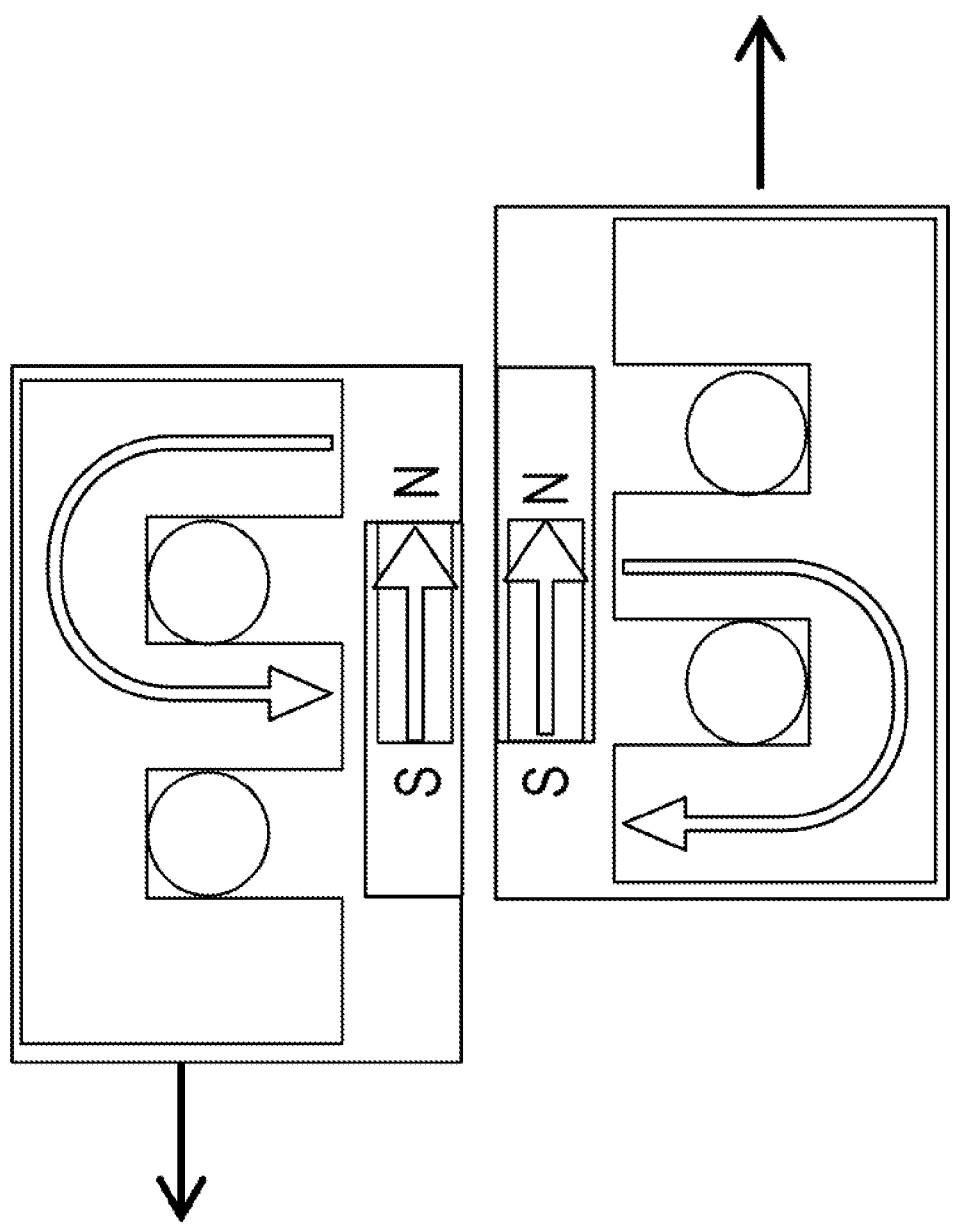

The further movement builds up a magnetic bias until the state illustrated in FIG. 4 has been reached. During this buildup of a magnetic bias, mechanical work, which is stored in the bias of the magnetic field, is performed while the parts move past each other.

Figure 5:
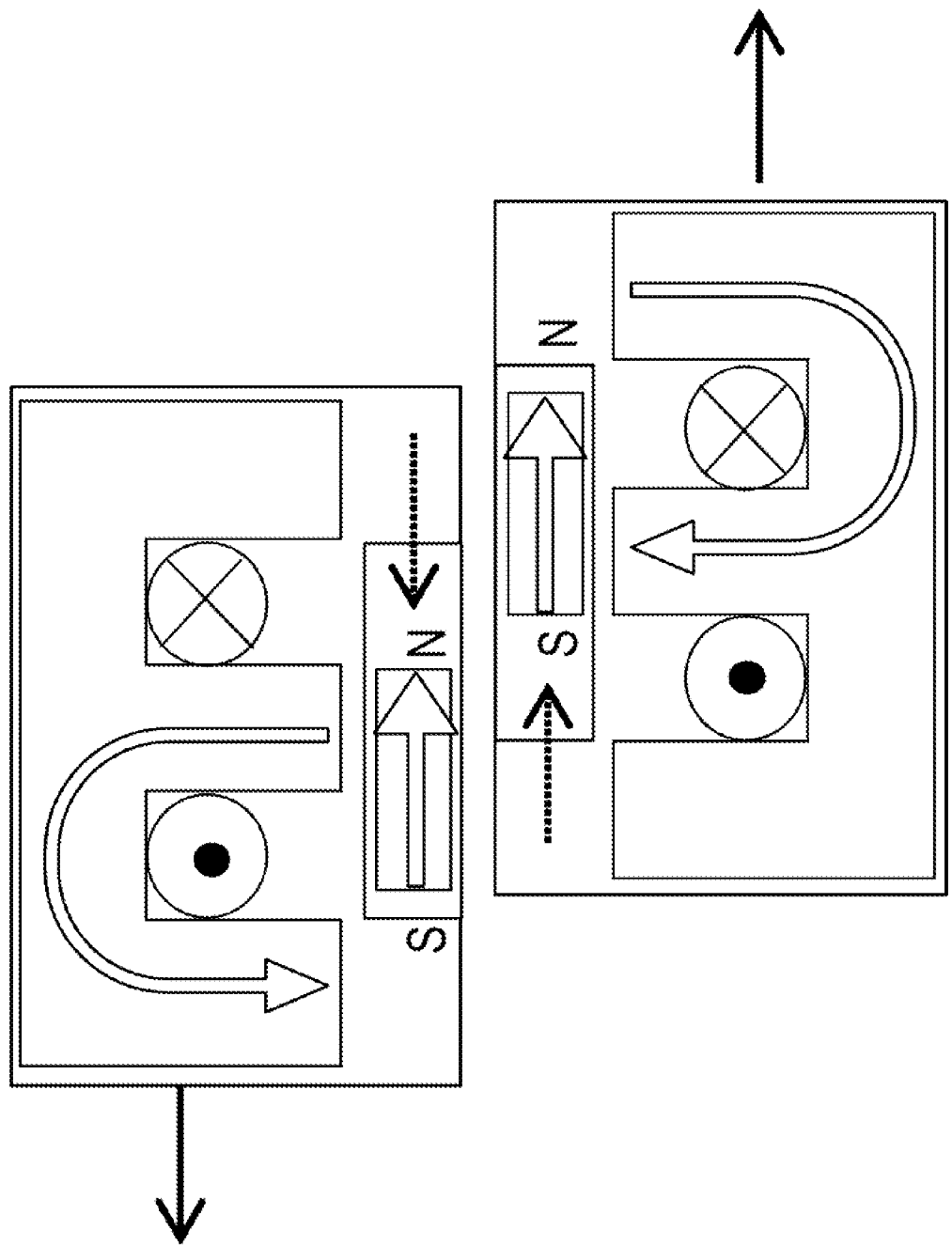

Once the unstable position has been crossed by the maximum magnetic bias illustrated in FIG. 4, the state illustrated in FIG. 5 is suddenly reached, the permanent magnets repelling each other and making contact with the limit stops situated at opposite ends in each case. At the same time, the direction of the magnetic flux in the center leg reverses direction so that a voltage with a high peak value due to the sudden rapid reversal of the magnetic field is induced in winding 6. The voltage pulse provided in this manner supplies the respective electronic circuit.

Figure 6:
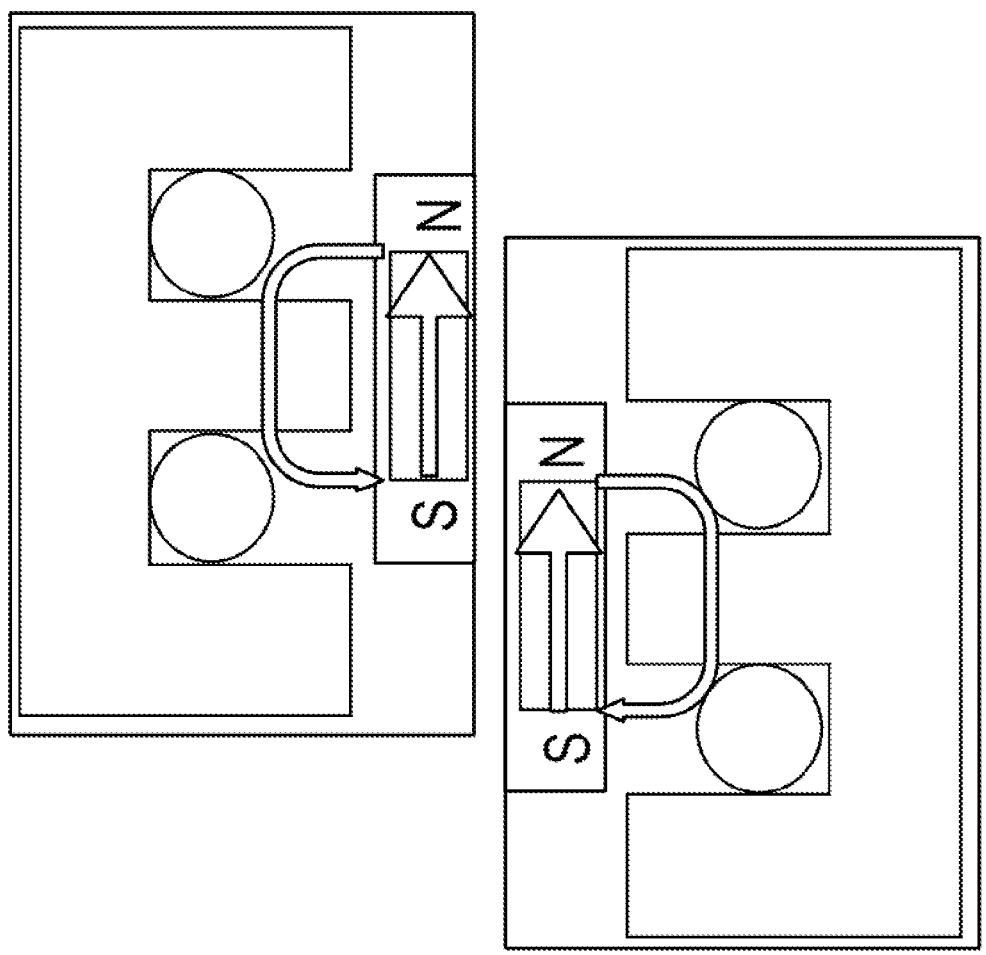
FIG. 6 and FIG. 7 schematically illustrate two different starting positions, which are provided prior to the sequence illustrated in FIG. 2 through FIG. 5.
Figure 7:
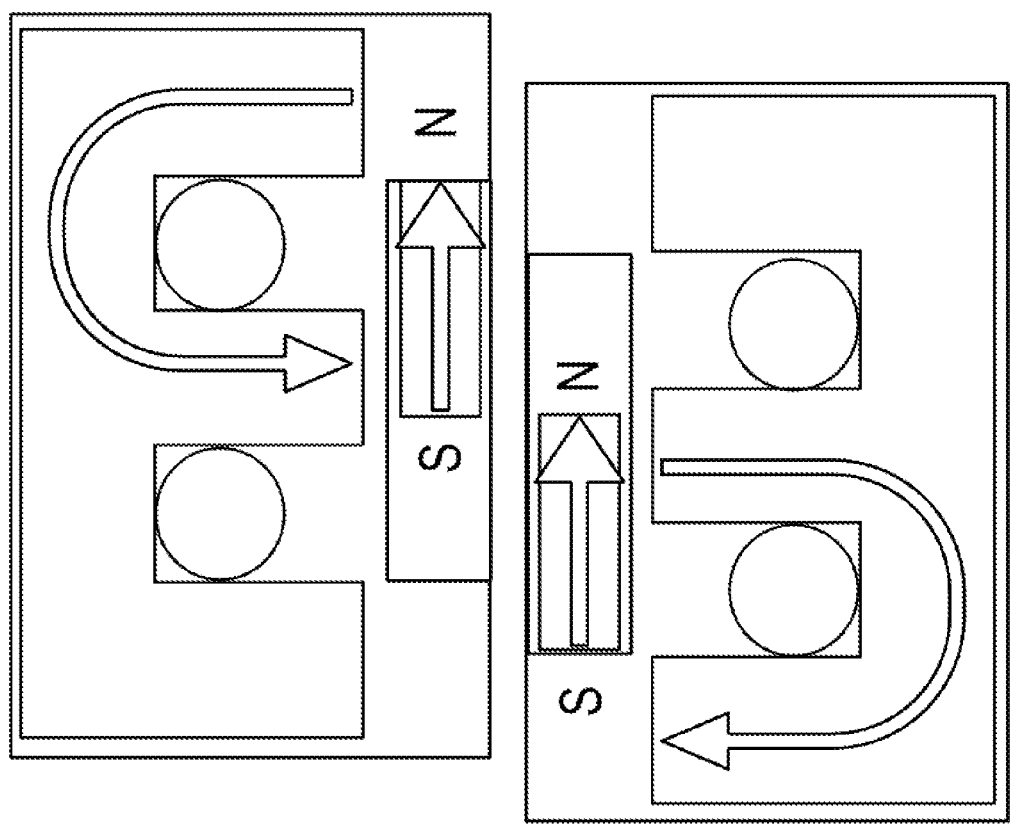
Figure 8:
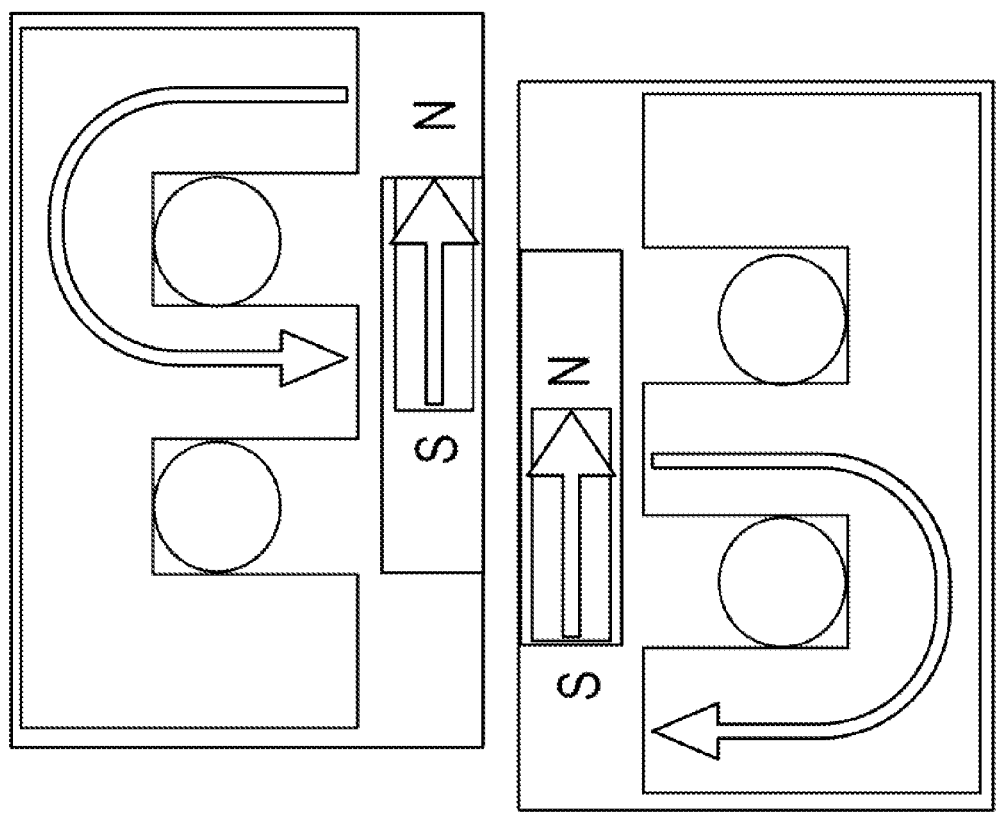
FIGS. 8 through 11 schematically illustrate the sequence of a pulse triggering during a movement of the two parts of the system relative to one another in a first direction.
Figure 9:
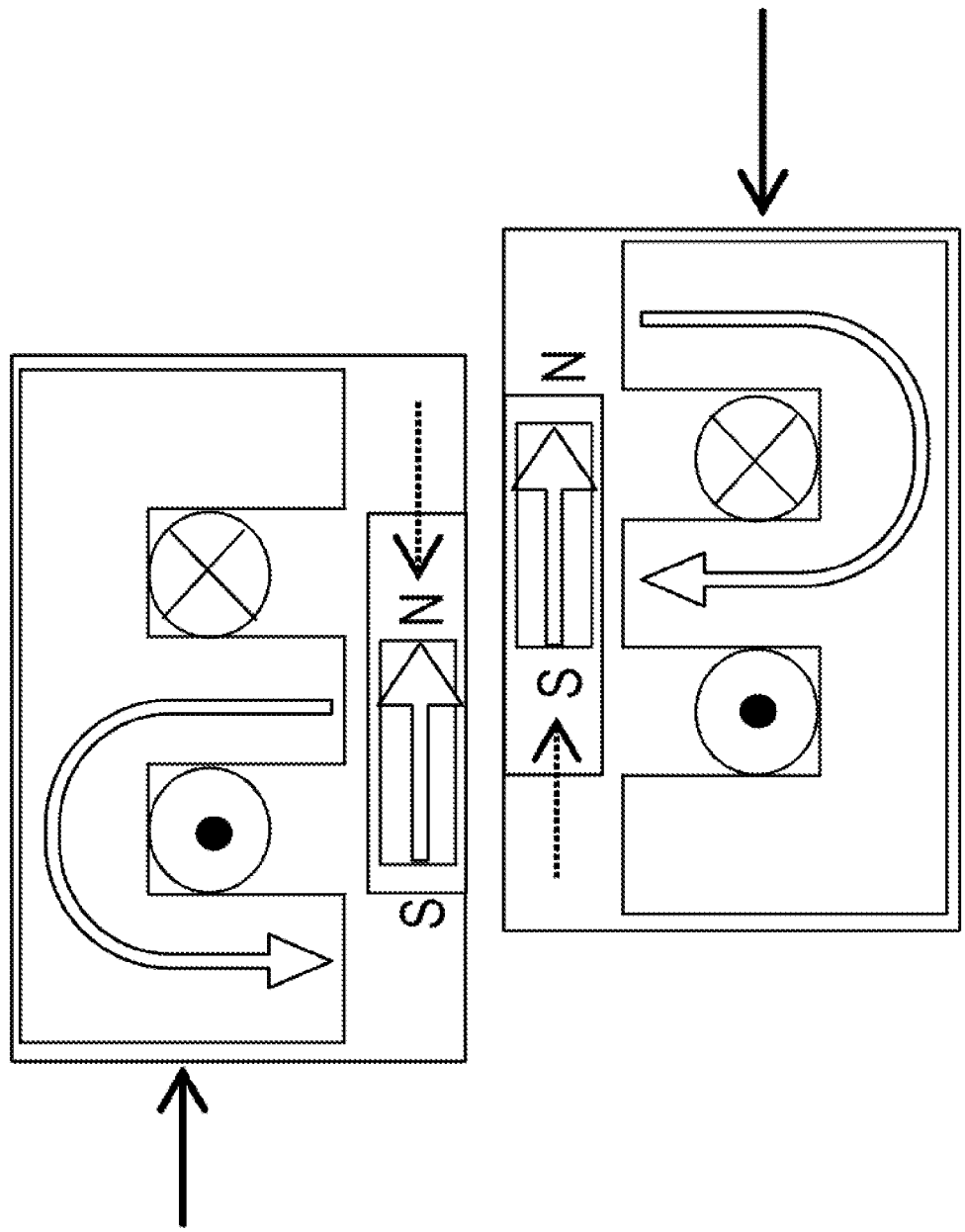
Figure 10:
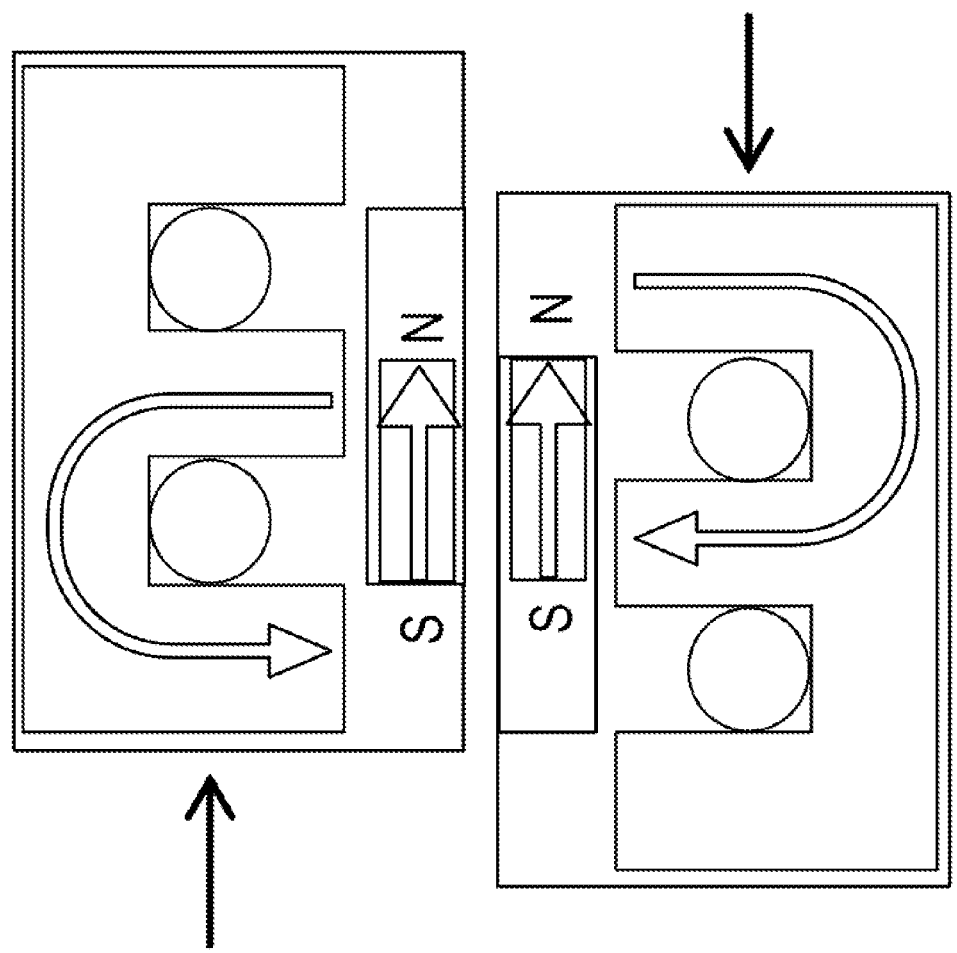
Figure 11:
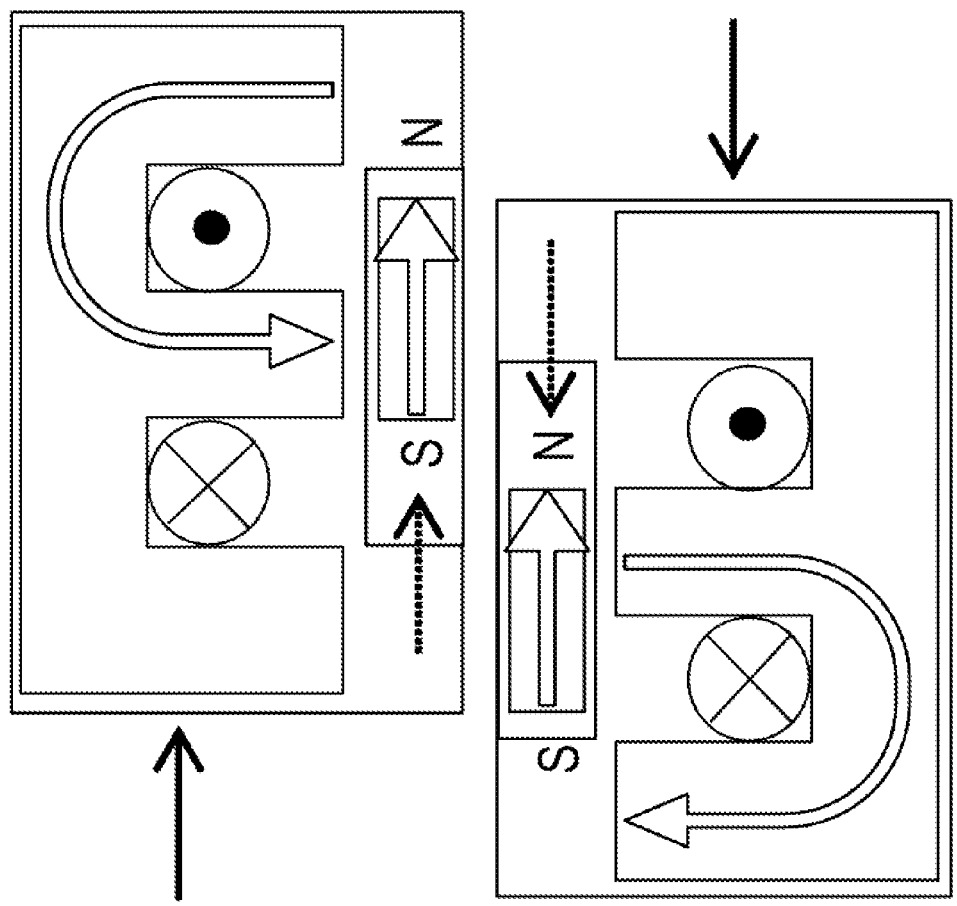
Figure 12:
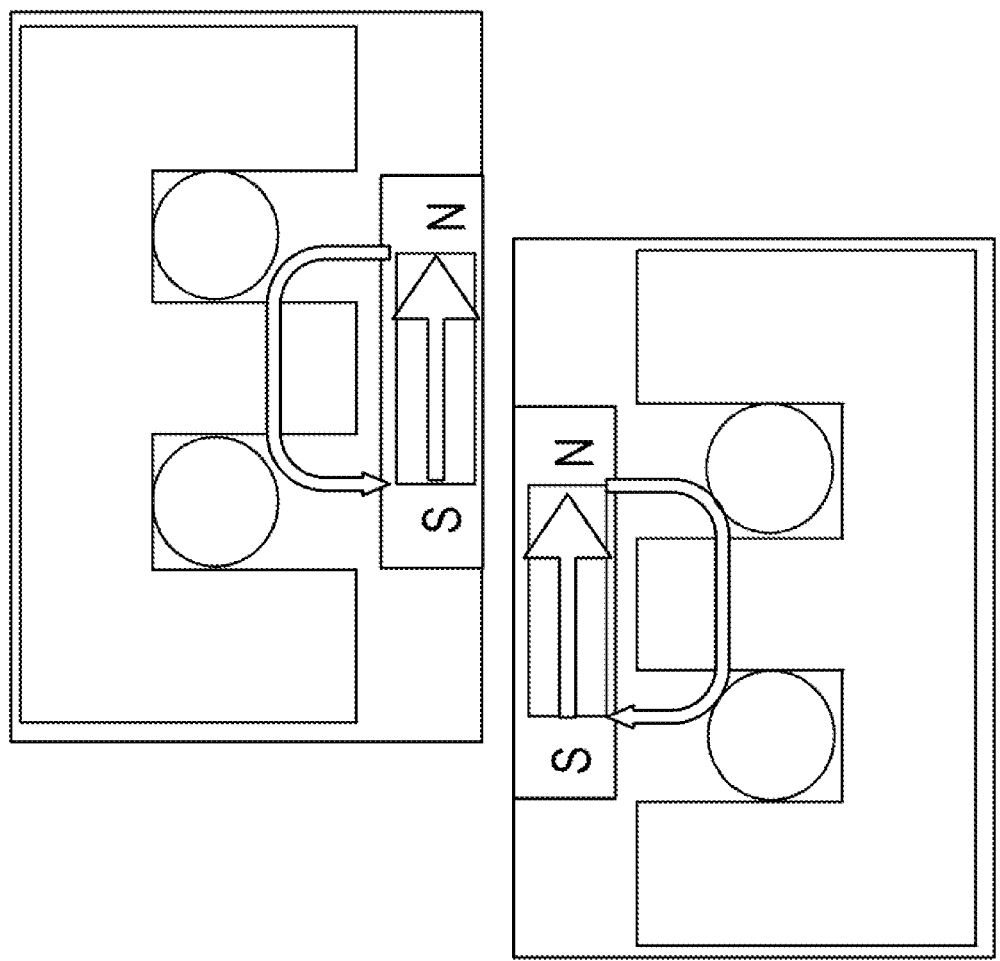
FIG. 12 and FIG. 13 schematically illustrate two different starting positions, which are provided prior to the sequence illustrated in FIG. 8 through FIG. 11.
Figure 13:
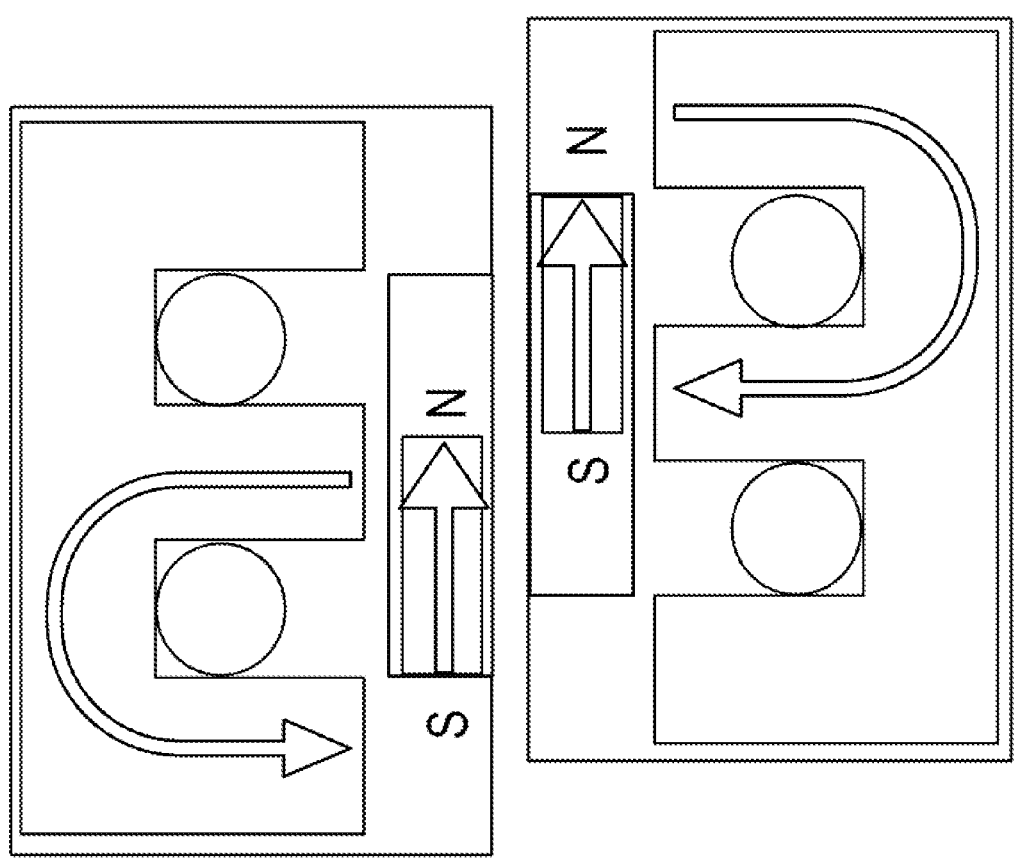

Other starting positions are illustrated in FIG. 6 and FIG. 7.

FIGS. 8 through 12 illustrate the states corresponding to FIGS. 2 through 7 in an opposite movement direction of the parts relative to each other.

The guide is arranged as a linear axis, for example.

As illustrated in the Figures, the second part is firmly connected to the rail part by its housing 9, and the first part is moved relative to the second part. As an alternative, the second part is also situated in a manner that allows it to move.

In further exemplary embodiments, the second part is replaced by a permanent magnet fixedly situated on the rail part. The described mode of action for the first part remains unchanged.

LIST OF REFERENCE NUMERALS 1 permanent magnet of the first part
2 guide
3 magnetic flux
4 relative movement direction
5 housing
6 winding
7 coil core
8 magnetic force acting on the permanent magnet
9 second housing

The invention claimed is:

1. A system, comprising:
a first part including a first winding around a first leg and/or a first center leg of a first coil core; and
a second part including a second winding around a second leg and/or a second center leg of a second coil core;
wherein the first part and the second part are arranged in parallel with each other and are movable relative to each other in a movement direction;
wherein the first part includes a first permanent magnet movable in parallel with the movement direction and a first guide adapted to guide the first permanent magnet; and
wherein the second part includes a second permanent magnet movable in parallel with the movement direction and a second guide adapted to guide the second permanent magnet.

2. The system according to claim 1, wherein the system is arranged as a generator adapted to generate electrical energy.

3. The system according to claim 1, wherein the first guide and/or the second guide is arranged as a linear guide.

4. The system according to claim 1, wherein the first permanent magnet and/or the second permanent magnet is linearly movable in parallel with the movement direction.

5. The system according to claim 1, wherein the first guide is adapted to guide the first permanent magnet in the movement direction and/or to limit the first permanent magnet in front and back in the movement direction, and/or the second guide is adapted to guide the second permanent magnet in the movement direction and/or to limit the second permanent magnet in front and back in the movement direction.

6. The system according to claim 1, wherein a magnetization direction of at least one of the permanent magnets is aligned in parallel with the movement direction inside the guide.

7. The system according to claim 1, wherein at least one of the permanent magnets has a freedom of movement in the respective guide such that in a first position a north pole of the permanent magnet is arranged closer to the leg than a south pole of the permanent magnet, and in a second position the south pole of the permanent magnet is arranged closer to the leg than the north pole of the permanent magnet.

8. The system according to claim 1, wherein a freedom of movement of at least one of the permanent magnets in the respective guide is smaller than a length of the permanent magnet in the movement direction.

9. The system according to claim 1, wherein a magnetic flux generated by at least one of the permanent magnets is conducted through the leg of the coil core, a direction of the magnetic flux in the leg being a function of a position and/or a linear position of the permanent magnet in the guide.

10. The system according to claim 9, wherein the direction of the magnetic flux in the leg arising in a first position and/or a first linear position of the permanent magnet is directed counter to the direction of the magnetic flux in the leg arising in a second position and/or a second linear position of the permanent magnet.

11. The system according to claim 1, wherein in a first position, at least one of the permanent magnets strikes a first limit stop of the respective guide, and in a second position, the permanent magnet strikes a second limit stop of the guide.

12. The system according to claim 1, wherein the second permanent magnet is arranged as a stationary permanent magnet, and/or the second part is arranged in mirror symmetry with the first part.

13. The system according to claim 12, wherein a magnetization direction of the permanent magnet of the second part is aligned in parallel with a magnetization direction of the first permanent magnet of the first part.

14. The system according to claim 1, wherein the first part is set apart from the second part.

15. The system according to claim 1, wherein a magnetization direction of the second permanent magnet is aligned in parallel with a movement direction inside the second guide.

16. The system according to claim 1, wherein a magnetic flux generated by the second permanent magnet is conducted through the second leg of the second coil core, a direction of the magnetic flux generated by the second permanent magnet in the second leg is a function of a position and/or a linear position of the second permanent magnet in the second guide, the direction of the magnetic flux in the second leg arising in a first position and/or a first linear position of the second permanent magnet is directed counter to the direction of the magnetic flux in the second leg arising in a second position and/or a second linear position of the second permanent magnet.

17. The system according to claim 1, wherein at least one of the permanent magnets has a movement clearance in the respective guide such that in a first position a north pole of the permanent magnets is arranged closer to the leg than a south pole of the permanent magnet, and such that in a second position the south pole of the permanent magnet is arranged closer to the leg than the north pole of the permanent magnet.

18. The system according to claim 1, wherein a movement clearance of one of the permanent magnets in the respective guide is smaller than a length of the permanent magnet in the movement direction.

19. The system according to claim 1, wherein in a first position, the second permanent magnet strikes a first limit stop of the second guide and in a second position, the second permanent magnet strikes a second limit stop of the second guide.

20. An installation, comprising:
a rail part;
a rail vehicle movably arranged on the rail part;
a system as recited in claim 1;
wherein the first part is arranged on the rail vehicle, and the second part is arranged on the rail part.

21. The installation according to claim 20, wherein the winding of the first part is adapted to feed a first electronic circuit including a first sensor and adapted to transmit signals from the first sensor in a contactless manner to a second electronic circuit of the second part, and/or the second winding of the second part is adapted to feed the second electronic circuit including a second sensor and adapted to transmit signals from the second sensor in a contactless manner to the first electronic circuit of the first part.

22. The installation according to claim 20, wherein the rail part is encompassed by a track switch of the installation.

* * * * *